US012731508B2

(12) United States Patent
Hu et al.

(10) Patent No.: US 12,731,508 B2
(45) Date of Patent: Sep. 8, 2026

(54) APPARATUS AND METHOD FOR SIMULATING DYNAMICS OF HYDROCARBON GENERATION AND EXPULSION IN GEOLOGICAL PROCESS

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Zongquan Hu, Beijing (CN); Zhongliang Ma, Beijing (CN); Lunju Zheng, Beijing (CN); Yongqiang Zhao, Beijing (CN); Qiang Wang, Beijing (CN); Chunhua Ni, Beijing (CN); Lingjie Yu, Beijing (CN); Wei Du, Beijing (CN); Chuan He, Beijing (CN); Jianfei Ma, Beijing (CN); Zhongbao Liu, Beijing (CN); Ruikang Bian, Beijing (CN); Baojian Shen, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 293 days.

(21) Appl. No.: 18/571,401

(22) PCT Filed: Sep. 29, 2021

(86) PCT No.: PCT/CN2021/121828
§ 371 (c)(1),
(2) Date: Dec. 18, 2023

(87) PCT Pub. No.: WO2022/262146
PCT Pub. Date: Dec. 22, 2022

(65) Prior Publication Data

US 2024/0290225 A1 Aug. 29, 2024

(30) Foreign Application Priority Data

Jun. 16, 2021 (CN) ........................ 202110665359.0

(51) Int. Cl.
*G09B 23/40* (2006.01)

(52) U.S. Cl.
CPC .................................. *G09B 23/40* (2013.01)

(58) Field of Classification Search
CPC ...... G09B 23/40; G09B 25/06; G01N 33/241; G01N 1/28; B01J 19/0073; B01J 3/04;
(Continued)

(56) References Cited

U.S. PATENT DOCUMENTS 3,933,434 A 1/1976 Matovich
5,082,787 A 1/1992 Nolte et al.
(Continued)

FOREIGN PATENT DOCUMENTS

CN 101520962 A 9/2009
CN 104941518 A 9/2015
(Continued)

*Primary Examiner* — John E Breene
(74) *Attorney, Agent, or Firm* — NKL Law; Allen Xue

(57) ABSTRACT

A device and method for simulating dynamics of hydrocarbon generation and expulsion in geological process is provided. The device contains a reaction system which has a reactor having a sample chamber formed therein for placing a sample and a sample sleeve being arranged within the sample chamber for receiving the sample. The sample sleeve has a cylindrical body enclosing the sample in a circumfer-
(Continued)

ential direction, an outer side wall of the cylindrical body being in engagement with an inner side wall of the reactor, and the cylindrical body being perforated to form a channel for product circulation between an outer side wall of the sample and the inner side wall of the reactor.

16 Claims, 8 Drawing Sheets

(58) Field of Classification Search
CPC .. B01J 3/002; B01J 3/003; B01J 2219/00011; B01J 2219/00162
USPC ........................................................ 73/865.6
See application file for complete search history.

(56) References Cited

U.S. PATENT DOCUMENTS

| | | | | |
|---|---|---|---|---|
| 5,167,139 | A * | 12/1992 | Lafargue | G01N 33/241<br>73/38 |
| 5,363,692 | A * | 11/1994 | Lafargue | G01N 33/241<br>73/38 |
| 6,405,797 | B2 * | 6/2002 | Davidson | E21B 43/16<br>166/177.6 |
| 8,165,817 | B2 * | 4/2012 | Betancourt | G01V 11/00<br>73/152.09 |
| 9,552,462 | B2 * | 1/2017 | Walters | G01N 33/241 |
| 10,845,291 | B2 * | 11/2020 | Kanj | G01N 15/0826 |
| 11,833,456 | B2 * | 12/2023 | Edvy | B01D 3/009 |
| 12,252,973 | B2 * | 3/2025 | Kleine | E21B 43/267 |
| 2018/0335374 | A1 | 11/2018 | Kanj et al. | |

FOREIGN PATENT DOCUMENTS

| | | | |
|---|---|---|---|
| CN | 106153434 | A | 11/2016 |
| CN | 106482924 | * | 3/2017 |
| CN | 108961967 | A | 12/2018 |
| CN | 109211746 | A | 1/2019 |
| CN | 109613213 | A | 4/2019 |
| CN | 109785724 | A | 5/2019 |
| CN | 110749526 | A | 2/2020 |
| CN | 111056725 | A | 4/2020 |
| CN | 113908773 | A | 1/2022 |
| CN | 113936537 | A | 1/2022 |

* cited by examiner

APPARATUS AND METHOD FOR SIMULATING DYNAMICS OF HYDROCARBON GENERATION AND EXPULSION IN GEOLOGICAL PROCESS

TECHNICAL FIELD

The present invention relates to the technical field of oil-gas geochemistry and petroleum geological exploration, and specifically to a temperature-pressure co-controlled experimental device for dynamics of hydrocarbon generation and expulsion. The present invention also relates to a temperature-pressure co-controlled experimental method for dynamics of hydrocarbon generation and expulsion.

TECHNICAL BACKGROUND

Under geological conditions, complex physical and chemical reactions of hydrocarbon generation and expulsion occur in source rock, wherein organic matter is under combined action of lithostatic pressure of overlying strata, formation fluid pressure and formation fluid in the limited pore space of source rock.

In order to study the hydrocarbon generation and expulsion of the source rock, experiments on simulation of hydrocarbon generation and expulsion can be carried out to obtain the characteristics thereof.

Traditional experiments on hydrocarbon generation and expulsion mainly study the amount of hydrocarbon generation of the source rock. In a traditional experimental method, the simulated temperature is converted into equivalent vitrinite reflectance (Ro), and a correlation between the vitrinite reflectance and the amount of hydrocarbon generation is established, which has great significance for subsequent resource evaluation. However, many ancient source rocks do not comprise vitrinite, and identification of Ro is rather difficult for sapropel-type source rock. As a result, such traditional experiments only involve study on simulation, but cannot be applied to the actual geological conditions.

Furthermore, an experiment on simulating dynamics of hydrocarbon generation and expulsion is also proposed in this field, wherein several groups of experiments on hydrocarbon generation and expulsion are carried out at different heating rates based on the geological process and the theoretical model of chemical kinetics, thereby obtaining activation energy and reaction frequency factor of hydrocarbon generation and expulsion reaction. Then, after specific data processing, the dynamics parameters of hydrocarbon generation and expulsion of source rock obtained from the above experiments can be extrapolated to the geological process, and there is no need to determine Ro. This experimental method can not only predict oil-gas production at different stages, but also infer oil-gas composition more accurately, thus becoming an important method in oil-gas research and exploration.

The similarity between the experimental process and the geological process is of the greatest importance in the experiment on simulating hydrocarbon generation and expulsion. At present, the most commonly used experimental devices mainly include two categories, i.e., open-system and closed-system devices.

The open-system experimental devices include Rock-Eval pyrolyzer, PY-GC pyrolysis gas chromatograph, etc. The disadvantage of open-system simulation experimental devices lies in failing to take into consideration the effect of pressure on hydrocarbon generation. In addition, under actual geological conditions, the hydrocarbon generation of source rock is not completely open. Therefore, there is discrepancy between the experimental conditions of the open-system simulation experimental devices and the actual geological conditions.

The closed-system experimental devices include small-volume sealed simulator MSSV, gold-tube autoclave system, etc. However, hydrocarbon expulsion process cannot be carried out in the closed-system experimental devices in a timely manner. As a result, liquid components generated in the devices cannot be discharged in time for analysis and determination. Moreover, both liquid hydrocarbon and heavy hydrocarbon gas components will be cracked at high temperatures, thus exaggerating the natural gas production and underestimating the potential for oil production to a certain degree.

The above two experimental conditions for reaction (characteristics of the systems) cannot be comparable to the geological conditions, so that the pyrolysis components do not match the actual hydrocarbon generation process. Consequently, there are uncertainties in many of the parameters in mathematical calculations. When the activation energy and frequency factor obtained by these methods are extrapolated to the geological conditions, the results thereof often differ considerably from the actual ones. In addition, with the conventional and unconventional oil-gas integrated exploration and development, the amount of discharged and retained oil and gas (i.e., the amount of oil and gas retained within the source rock) are of more concern in resource evaluation. However, the above methods can only provide the amount of hydrocarbon generation, but not the accurate amount of discharged and retained oil and gas, which are of more concern at present.

Currently, certain experimental devices and methods for determining the amount of discharged oil and gas have also been proposed in the field. However, in these methods it is difficult to effectively discharge the products generated by source rock sample during the experiment from the reactor, and to separate and quantitatively collect the products. Therefore, the obtained amount of discharged oil and gas still lacks accuracy and effectiveness.

For example, CN108961967A discloses a hot-pressing hydrocarbon-generating simulation reactor. During experiment, products generated from the rock sample can be discharged through a porous sintered plate and a first discharge port. With the hot-pressing hydrocarbon-generating simulation reactor, most of the products in the experiment can be discharged out of the reactor. However, there will still be residual products between the rock sample and the inner wall of the reactor, which are difficult to discharge, and thus are disadvantageous to quantitative collection and analysis of products.

In addition, CN106153434A discloses a reactor, wherein a sleeving assembly is provided between the reactor and the rock sample, for accommodating rock sample of smaller size. During experiment using the reactor, the products of the rock sample are discharged through a first filter member, a space-adjusting member, a center blind hole and a first overflow hole that are located above the rock sample, or through a second filter member and a second overflow hole that are located below the rock sample. Similarly, the products tend to remain between the inner wall of the sleeving assembly and the rock sample.

Furthermore, the reactor in the above two prior arts also suffer from other problems including sealing and properly holding the rock samples. For example, the existing pressing structure cannot achieve dynamic sealing in high-temperature and high-pressure conditions during simulation of ultra-deep depths (i.e., more than 10,000 meters of burial depth, with lithostatic pressure exceeding approximately 250 MPa and fluid pressure exceeding approximately 150 MPa). Only one simulation experiment on temperature, pressure, and time can be performed at a time (4-5 days), and it is time-consuming to carry out experiments on hydrocarbon generation and expulsion dynamics (requiring at least three different heating rates). The product separation and collection system only performs simple gas-liquid separation by means of a cold trap, and the liquid hydrocarbon quantification is performed by constant weight method, which causes a large amount of light hydrocarbon loss during the quantification process, thus affecting the accuracy of the data in the dynamical model.

In the experiment, it is important to reproduce the geological process of hydrocarbon generation and expulsion of the source rock as accurate as possible, select proper temperature and pressure conditions to simulate the actual geological condition, collect all the products in the experimental system as much as possible, and adopt an appropriate method to separate and quantitatively collect the products. This is of great theoretical value to further understand the mechanism of hydrocarbon generation and expulsion of the source rock and the gas production process of the source rock, and further study the mechanism of oil-gas migration and accumulation mode, as well as of great practical significance for the actual exploration for oil and gas.

SUMMARY OF THE INVENTION

In view of the above technical problems, the present invention aims to propose an experimental device and method for simulating dynamics of hydrocarbon generation and expulsion in geological process, with which at least one of the above problems can be eliminated or alleviated.

According to a first aspect of the present invention, an experimental device for dynamics of hydrocarbon generation and expulsion is proposed, which comprises a reactor having a sample chamber formed therein for placing a sample, a sample sleeve being arranged within the sample chamber for receiving the sample. The sample sleeve comprises a cylindrical body enclosing the sample in a circumferential direction, an outer side wall of the cylindrical body being in engagement with an inner side wall of the reactor, and the cylindrical body being perforated to form a channel for product circulation between an outer side wall of the sample and the inner side wall of the reactor.

In the above device, a circulation channel is formed between the outer side wall of the sample and the inner side wall of the reactor through the perforated structure of the sample sleeve. This solves the problem of difficulty in discharging fluid products due to high fluid viscosity and low fluid flow rate between the sample and the inner side wall of the reactor. As a result, the device is able to discharge the fluid produced by the sample efficiently, avoiding residual product between the side wall of the sample and the side wall of the reactor, thereby playing a significant role in accurate determination of the amount of discharged oil and gas.

In one embodiment, the cylindrical body comprises a plurality of neck portions each having a relatively small outer diameter, at least one flow hole being formed on each of the neck portions to pass through the neck portion along a radial direction, wherein the neck portion is spaced apart from the inner side wall of the reactor to form a gap in communication with the flow hole when the sample sleeve is arranged within the reactor, and the flow hole overlaps the outer side wall of the sample when the sample is arranged within the sample sleeve. The cylindrical body further comprises a plurality of closed portions each having a relatively large outer diameter, the plurality of closed portions and the plurality of neck portions being alternately arranged along a longitudinal direction, and the closed portions abutting against the inner side wall of the reactor when the cylindrical body is arranged within the reactor, wherein at least one flow groove passing through the cylindrical body along the longitudinal direction are formed on the cylindrical body and in communication with the gap between each neck portion and the inner side wall of the reactor, so that the channel for product circulation is formed between the outer side wall of the sample and the inner side wall of the reactor through the flow hole, the gap and the flow groove.

In one embodiment, the cylindrical body is formed by a porous medium element, so that the channel for product circulation is formed between the outer side wall of the sample and the inner side wall of the reactor through pores of the porous medium element.

In one embodiment, the porous medium element has a porosity ranged from 15%-30%.

In one embodiment, the porous medium element has a permeability ranged from 0.1-1 $\mu m^2$.

In one embodiment, the sample sleeve further comprises a top cover connected to the cylindrical body in a sealing manner, wherein the top cover is configured to be porous and enclose the sample together with the cylindrical body, so that the sample is in communication with the sample chamber through the top cover.

In one embodiment, the top cover is provided with a communication hole passing through the top cover along an axial direction.

In one embodiment, the top cover is formed by a porous medium element.

In one embodiment, the experimental device for dynamics of hydrocarbon generation and expulsion comprises the reactor configured to be cylindrical, and having an opening in communication with the sample chamber at each of two opposite ends of the reactor. The experimental device for dynamics of hydrocarbon generation and expulsion further comprises a fixing clamp configured to be inserted into the sample chamber from one end of the reactor, and a pressurizer comprising a piston cylinder at the other end of the reactor, and an inner piston rod, one end of the inner piston rod being inserted into the piston cylinder and in cooperation with the piston cylinder in a sealed and slidable manner, the other end thereof extending out of the piston cylinder and being inserted into the sample chamber of the reactor, so as to clamp the sample in the sample chamber together with the fixing clamp. The pressurizer further comprises an annular outer piston rod arranged around the inner piston rod, one end of the outer piston rod being inserted into the piston cylinder and slidable relative to the piston cylinder in a sealed manner, the other end of the outer piston rod extending out of the piston cylinder and being inserted into the sample chamber of the reactor, wherein the fixing clamp and the pressurizer clamp two ends of the sample sleeve respectively, thereby realizing sealing of the reactor together with the sample sleeve.

In one embodiment, a first sealing assembly is provided between a portion of the fixing clamp inserted into the sample chamber and the sample sleeve, and a second sealing assembly is provided between the other end of the outer piston rod and the sample sleeve. When the outer piston rod moves toward the reactor, the first sealing assembly is pressed to expand radially to form a seal between the fixing clamp and the inner side wall of the reactor, and the second sealing assembly is pressed to expand radially to form a seal between the inner piston rod and the inner side wall of the reactor.

In one embodiment, a first wedge portion extending along the longitudinal direction is formed at one end of the cylindrical body, and the first sealing assembly comprises a first sealing ring in engagement with the first wedge portion and formed with a first slot facing toward the first wedge portion, the first sealing ring expanding radially to form a seal when the first wedge portion is inserted into the first slot. A second wedge portion extending along the longitudinal direction is formed at the other end of the cylindrical body, and the second sealing assembly comprises a second sealing ring in engagement with the second wedge portion and formed with a second slot facing toward the second wedge portion, the second sealing ring expanding radially to form a seal when the second wedge portion is inserted into the second slot.

In one embodiment, the inner piston rod comprises an inner top rod inserted into the sample chamber of the reactor, the inner top rod comprising a cylindrical inner top rod body and an inner top rod flange extending radially outward from an end portion of the inner top rod body. The outer piston rod comprises a lower pressure ring inserted into the sample chamber of the reactor and arranged between the reactor and the inner top rod, an upper end surface of the lower pressure ring at least partially overlapping a lower end surface of the inner top rod flange, and the lower pressure ring comprising a cylindrical lower pressure ring body and a lower pressure ring flange extending radially outward from an end portion of the lower pressure ring body.

In one embodiment, the device further comprises a fixing ring arranged between the reactor and the lower pressure ring, and detachably connected to the reactor, an upper end surface of the fixing ring at least partially overlapping a lower end surface of the lower pressure ring flange.

In one embodiment, the experimental device for dynamics of hydrocarbon generation and expulsion comprises a plurality of reaction systems connected in parallel, a control system for controlling parameters of temperature, pressure and time of each reaction system, a formation fluid injection system for injecting formation fluid into each reaction system, a hydrocarbon expulsion system connected to an outlet end of each reaction system, for discharging products from the reaction system during an experiment on dynamics of hydrocarbon generation and expulsion, and a product separation and quantification system for separating, collecting and quantifying the products, comprising a solvent displacer connected to an inlet end of each reaction system, and a gas-liquid separation tank connected to an outlet end of the hydrocarbon expulsion system. The experimental device further comprises a vacuuming system provided between the hydrocarbon expulsion system and the gas-liquid separation tank, for vacuuming the reaction system, the hydrocarbon expulsion system and the product separation and quantification system.

In one embodiment, the product separation and quantification system further comprises a gas metering collector and a liquid light hydrocarbon collection tank, which are in communication with the gas-liquid separation tank, for collecting gas and liquid light hydrocarbon separated from the gas-liquid separation tank, respectively.

In one embodiment, a light hydrocarbon purifier for removing moisture is provided between the liquid light hydrocarbon collection tank arranged in a cold trap and the gas-liquid separation tank arranged in an electronic cold/hot trap.

According to a second aspect of the present invention, an experimental method for simulating dynamics of hydrocarbon generation and expulsion using the above experimental device is provided, which comprises steps of mounting the sample within the sample sleeve, which are then placed in the reactor, and conducting an experiment on simulating dynamics of hydrocarbon generation and expulsion.

In one embodiment, the outer piston rod moves upward when the sample is placed in the reactor, so that the outer piston rod and the fixing clamp support two ends of the sample sleeve respectively, forming a seal within the reactor. The inner piston rod moves upward so as to clamp the sample together with the fixing clamp.

In one embodiment, after the experiment, the fixing clamp is removed to form an opening at one end of the reactor and in communication with the sample chamber, so that the sample in the sample chamber is pushed by the inner piston rod at the other end of the reactor until the sample leaves the reactor via the opening.

In one embodiment, after the experiment the products in the reactor are collected, wherein the liquid light hydrocarbon and the gas are collected separately.

Compared with the prior arts, the present application has the following advantages. The experimental device according to the present invention is able to simultaneously realize the hydrocarbon generation and expulsion of a plurality of samples through a plurality of reaction systems connected in parallel, thereby significantly improving the experimental efficiency. Furthermore, the experimental device is able to collect, quantify, and analyze different components (i.e., heavy hydrocarbon, liquid light hydrocarbon, water and gas) in the products through the product separation and quantification system. The perforated sample sleeve can avoid residual product in the reactor, and effectively avoid the loss of products, especially liquid light hydrocarbon, in combination with the solvent displacer.

BRIEF DESCRIPTION OF THE DRAWINGS

The present invention will be further described below with reference to the drawings.

In the drawings, the same reference numerals are used to indicate the same components. In the present application, all accompanying drawings are schematic ones, provided to illustrate the principle of the present invention merely, and are not necessarily drawn to actual scale.

DETAILED DESCRIPTION OF EMBODIMENTS

The present invention will be further described below with reference to the drawings.

Figure 1:
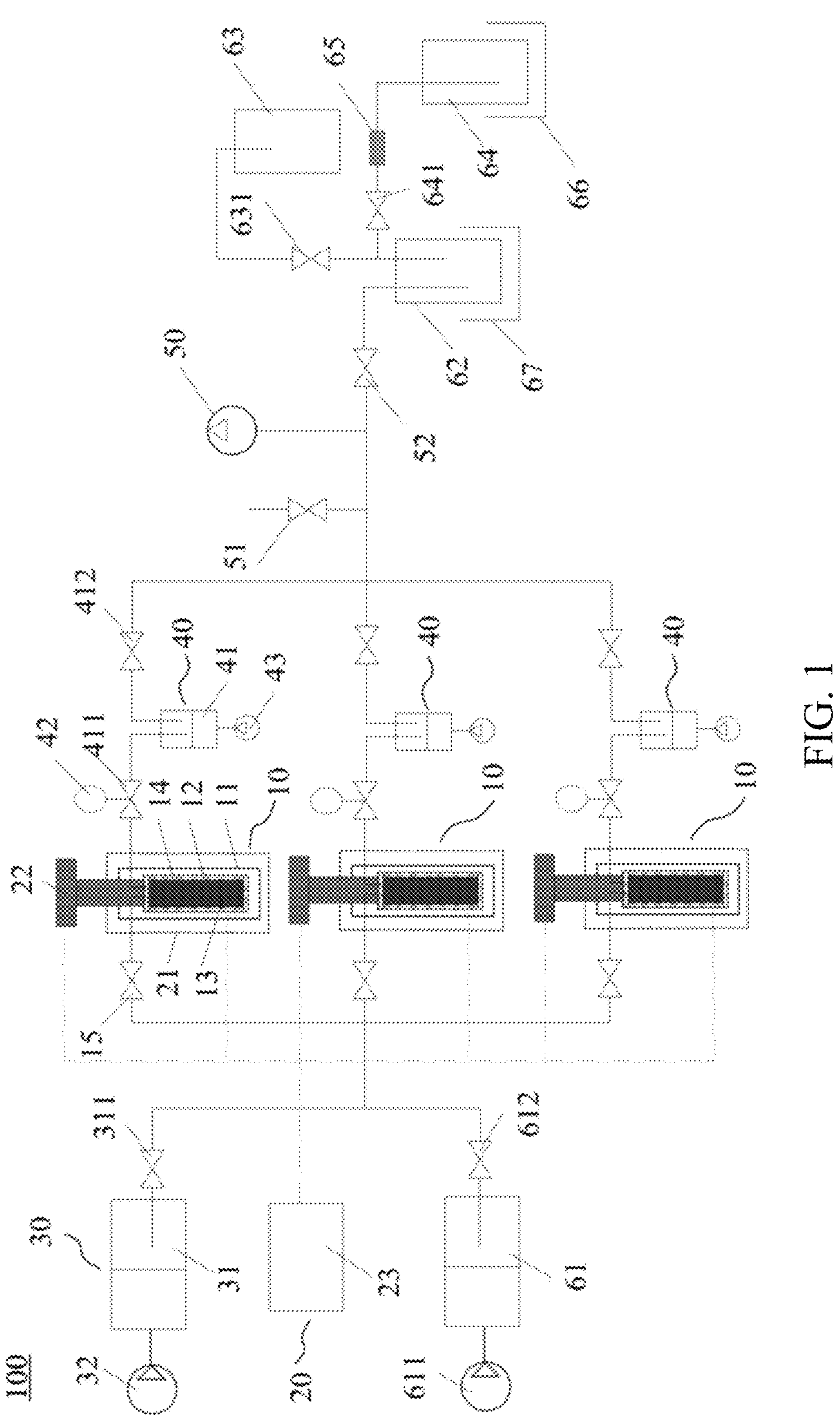
FIG. 1 schematically shows a structure of an experimental device for dynamics of hydrocarbon generation and expulsion according to the present invention.

FIG. 1 schematically shows a structure of an experimental device for dynamics of hydrocarbon generation and expulsion 100 according to the present invention. As shown in FIG. 1, the experimental device for dynamics of hydrocarbon generation and expulsion 100 comprises a plurality of high-temperature and high-pressure reaction systems 10 connected in parallel. The reaction system 10 is used to simulate hydrocarbon generation and expulsion of source rock in different geological conditions (e.g., different temperatures, pressures, times, etc.), and comprises a high-temperature and high-pressure reactor 11, in which a sample chamber 12 is formed for placing a sample 13. The high-temperature and high-pressure reactor 11 can be made of, for example, KA4145 high-temperature and high-strength alloy, which has an allowable stress of 350 MPa at 600° C., does not creep in high-temperature and high-pressure conditions, and is also corrosion-resistant. Thus it is able to effectively simulate the high-temperature and high-pressure environment required for experiments on dynamics of hydrocarbon generation and expulsion in deep or ultra-deep source rock.

Figure 2:
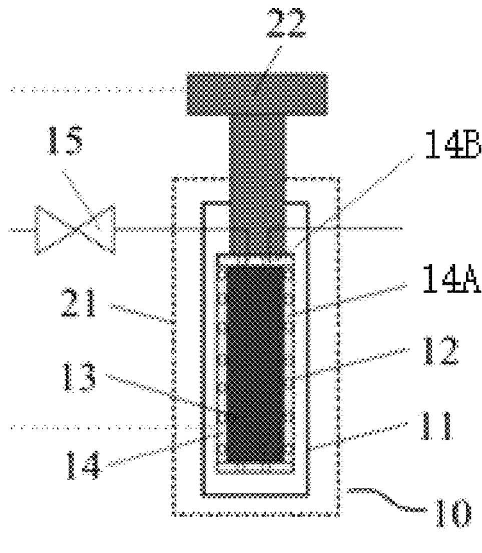
FIG. 2 schematically shows a structure of a high-temperature and high-pressure reaction system in the experimental device for dynamics of hydrocarbon generation and expulsion as shown in FIG. 1.

According to the present invention, the high-temperature and high-pressure reaction system 10 further comprises a sample sleeve 14 arranged within the sample chamber 12. As shown in FIG. 2, the sample sleeve 14 comprises a cylindrical body 14A and a top cover 14B adapted to be mounted on the cylindrical body 14A. The sample 13 is arranged within the cylindrical body 14A. The top cover 14B is fixedly connected to and sealed with the cylindrical body 14A through thread. The sample 13 may be, for example, a collected source rock sample. During the experiment, the source rock sample needs to be cut to form the sample 13 that can be fitted into the sample sleeve 14. For example, the sample 13 may be cut in a shape of a cylinder with a diameter smaller than an inner diameter of the cylindrical body 14A, and a length smaller than a length of the cylindrical body 14A.

In an embodiment as shown in FIG. 2, the sample sleeve 14 is made of material with high porosity and permeability, so that the cylindrical body 14A and the top cover 14B are each formed as a porous medium element 14, with the porosity in a range of 15%-30% and the permeability in a range of 0.1-1 $\mu m^2$. Preferably, the porous medium element can be made of sintered stainless steel. The porous medium element allows for better pore permeability conditions, so that the oil generated in the source rock will not be retained within the sample or on the surface of the sample, but instead, can be discharged directly into the porous medium element, which facilitates cleaning and collection. In particular, the oil in the sample 13 can flow along an axial direction through the cylindrical body 14A on the side. In this manner, oil will not be retained between the sample 13 and an inner side wall of the reactor 11. The porous medium element is capable of simulating reservoir rock (reservoir formation) in the vicinity of the underground source rock, so that the experimental device for dynamics of hydrocarbon generation and expulsion 100 can provide a simulated environment more similar to the actual geological condition.

Figure 7:
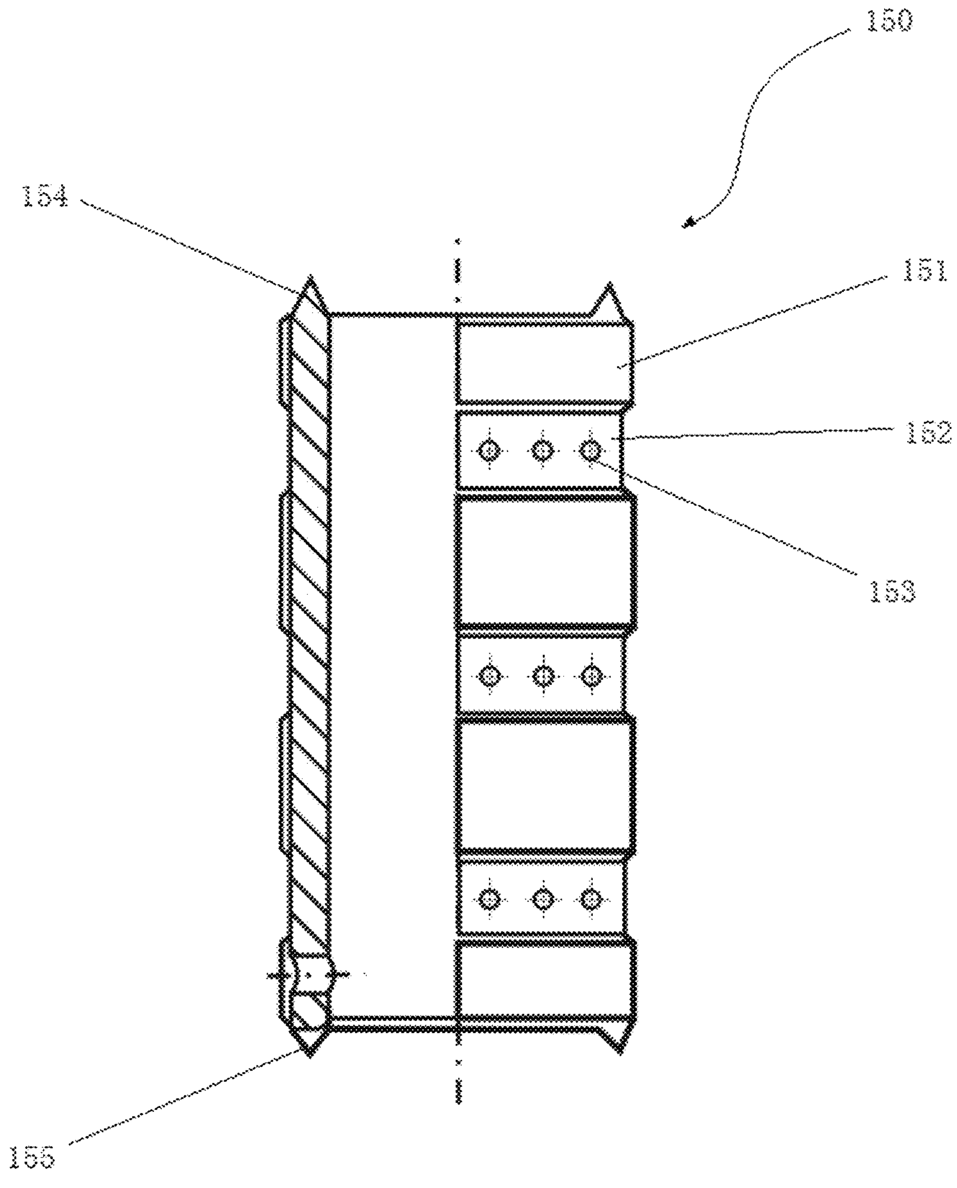
FIG. 7 schematically shows a structure of one embodiment of a sample sleeve in the high-temperature and high-pressure reaction system as shown in FIG. 5.

FIG. 7 shows another preferred embodiment of the cylindrical body 150. The cylindrical body 150 includes flow holes 153 passing through the cylindrical body 150 along a radial direction. Fluid (e.g., inert gas, water, etc.) may flow into a space between the cylindrical body 150 and the reactor 105 through a lower joint 113 provided at a lower portion of a sidewall of the reactor 105, into the cylindrical body 150 through the flow holes 153, and then into the pore space of the sample 106. The flow holes 153 make it easier and faster to inject the fluid into the pore space of the sample 106, which is important for carrying out the experiment smoothly.

Figure 8:
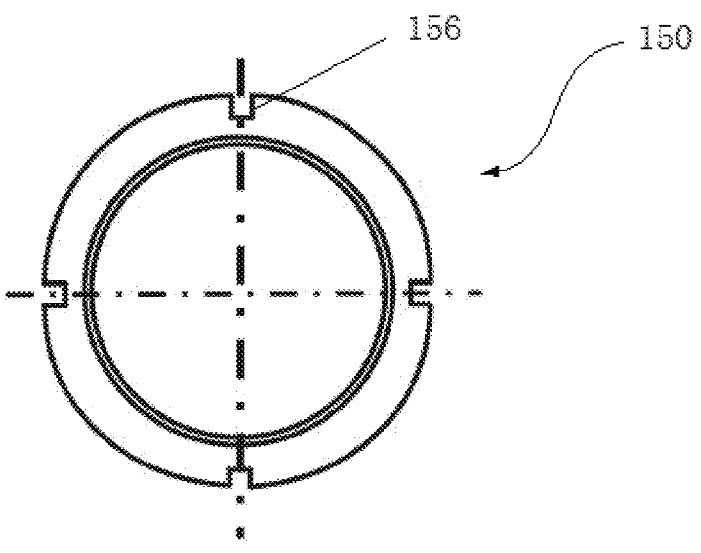
FIG. 8 is a view showing an end portion of the sample sleeve as shown in FIG. 7.

Preferably, as shown in FIG. 7, the cylindrical body 150 comprises neck portions 152 each with a smaller outer diameter, and closed portions 151 each with a larger outer diameter. A plurality of neck portions 152 and a plurality of closed portions 151 are alternately arranged along a longitudinal direction. FIG. 8 is a top view of the cylindrical body 150 in FIG. 7. As shown in FIG. 8, flow grooves 156 passing through the cylindrical body 150 along the longitudinal direction are provided on an outer side of the cylindrical body 150. When the cylindrical body 150 is installed in the reactor 105, the closed portions 151 will abut against an inner wall of the reactor 105, while the neck portions 152 will be spaced apart from the inner wall of the reactor 105 to form gaps therebetween. The flow grooves 156 are able to communicate the gaps between the neck portions 152 and the reactor 105, so that the gaps are all in communication with the lower joint 113. In this manner, the fluid, when entering the sample chamber of the reactor 105 through the lower joint 113, is able to enter each gap through the flow grooves 156 and then be injected into the pore space of the sample 106 through the flow holes 153 on each neck portion 152. In this manner, the fluid can be injected into the pore space of the rock sample 106 uniformly and rapidly.

Furthermore, when the fluid is discharged via the upper joint 111 and/or the lower joint 113, the fluid in the pore space of the rock sample 106 is able to flow to the upper joint 111 and/or the lower joint 113 via the flow holes 153 and the flow grooves 156. Therefore, effective rinsing can be ensured between the sample 106 and the cylindrical body 150 of the sample sleeve, and between the cylindrical body 150 and the inner side wall of the reactor 105, so that the fluid will not be retained therebetween.

Both of the above structures of the cylindrical body 150 are more conducive to a more accurate amount of discharged oil and gas. Thus, the experimental results are of more practical significance.

Figure 3:
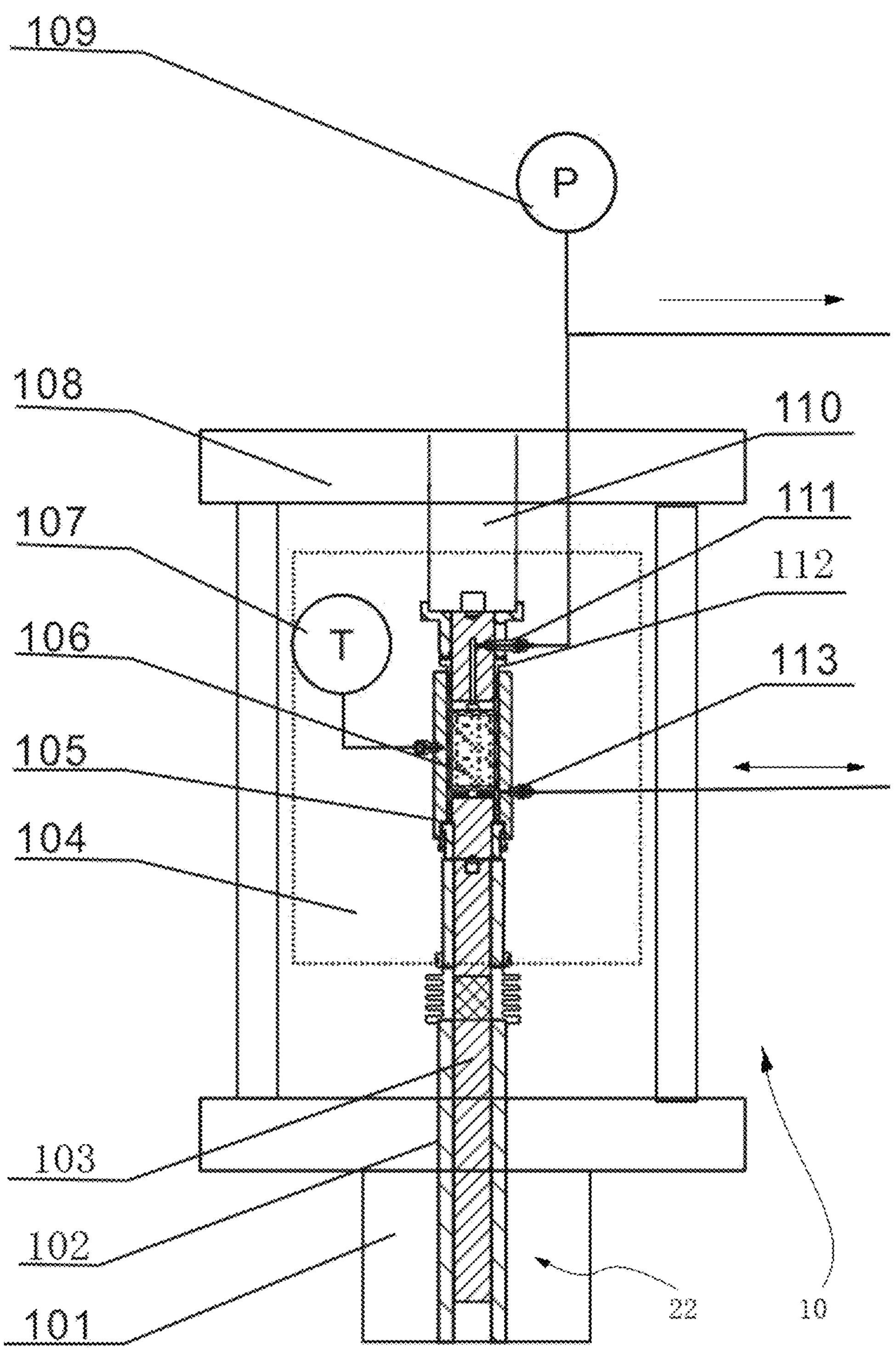
FIG. 3 schematically shows a structure of one embodiment of the high-temperature and high-pressure reaction system in the experimental device for dynamics of hydrocarbon generation and expulsion according to the present invention.
Figure 4:
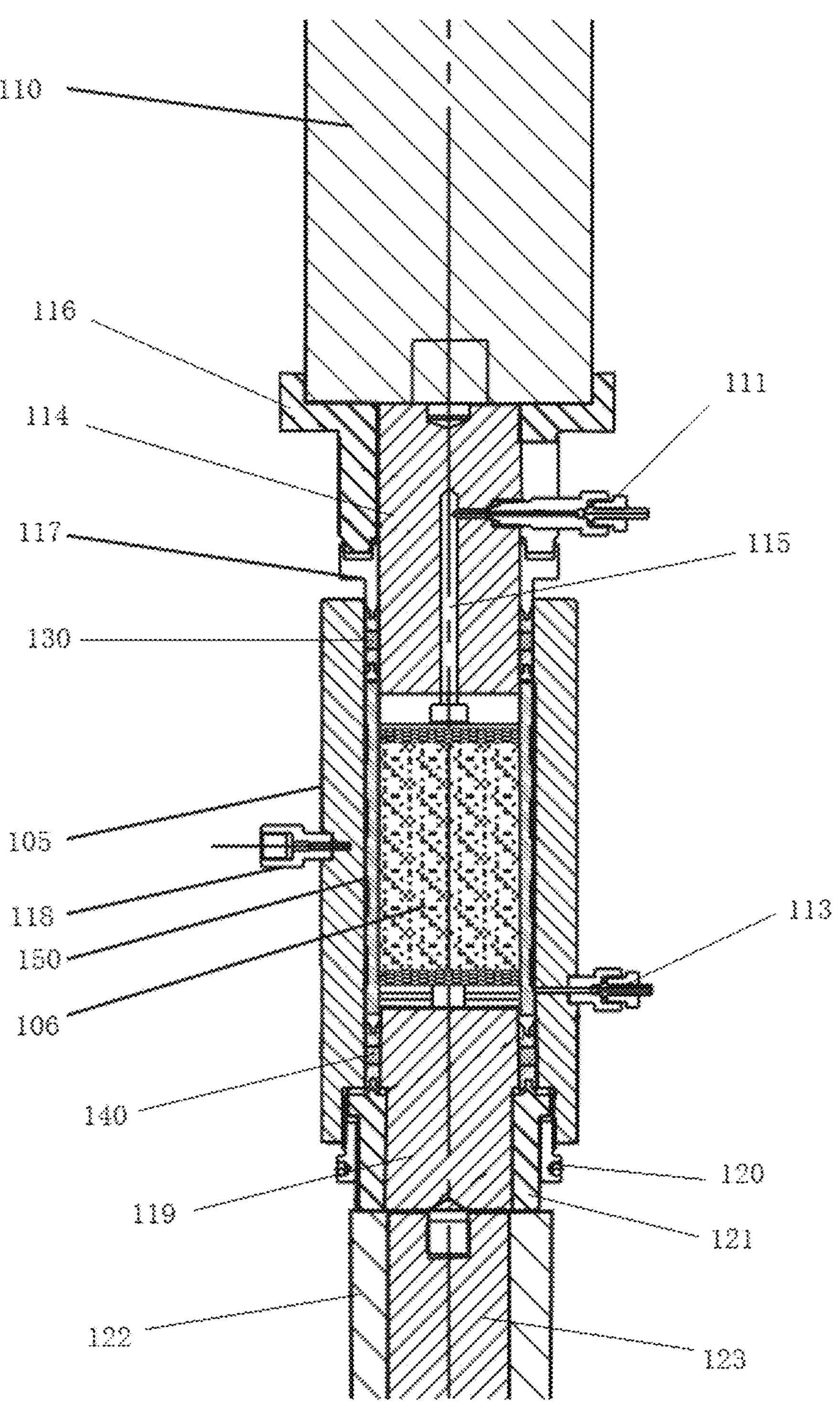
FIG. 4 is a partial enlargement view of the high-temperature and high-pressure reaction system as shown in FIG. 3.

Also as shown in FIG. 1, the reaction system 10 further comprises a pressurizer 22 for each reactor 11. In the embodiment as shown in FIG. 1, the pressurizer 22 is arranged at a top of a corresponding high-temperature and high-pressure reactor 11 for applying pressure to the sample 13 therein, thereby realizing the fixation of the sample 13. FIG. 3 and FIG. 4 further show another embodiment of the pressurizer, which will be described in more detail below.

According to the present invention, the experimental device for dynamics of hydrocarbon generation and expulsion 100 further comprises a control system 20. As shown in FIG. 1, the control system 20 comprises a plurality of heating furnaces 21 and a controller 23. The controller 23 is connected to the heating furnaces 21 and the pressurizers 22 via signal lines (dashed lines in FIG. 1), respectively, for controlling the heating furnaces 21 and the pressurizers 22. The high-pressure reaction system 10 is provided inside a corresponding heating furnace 21, which is for heating up the high-pressure reaction system 10. During the experiment, the heating furnaces 21 and the pressurizers 22 are controlled by the controller 23 to heat and pressurize the high-temperature and high-pressure reactor 11, so as to simulate the experimental environment of the source rock under different geological conditions, such as different temperatures, pressures, time or the like.

In this embodiment, the pressurizer 22 is able to provide both the lithostatic rock pressure on the sample 13 and the sealing pressure on the high-temperature and high-pressure reaction system 10 during the experiment, wherein the lithostatic rock pressure on the sample 13 is approximately 0-250 MPa, and the sealing pressure on the high-temperature and high-pressure reaction system 10 is approximately 0-250 MPa, with the maximum formation fluid pressure no less than approximately 150 MPa. The maximum heating temperature of the heating furnace 21 is no less than approximately 600° C. Moreover, the heating speed of the heating furnace 21 is configured to be adjustable, so that the temperature is consistent during the heating, and the accuracy can be guaranteed within a range of ±1° C. The controller 23 can be programmed to control the temperature and pressure of the high-temperature and high-pressure reactor 11 in different high-temperature and high-pressure reaction systems 10 during the experiment, thereby simulating the continuously increasing burial depth of the source rock formation in geological history. In one embodiment, the heating furnace 21 may be a high-temperature box-type heating furnace with hot-air circulating.

As shown in FIG. 1, the experimental device for dynamics of hydrocarbon generation and expulsion 100 further comprises a formation fluid injection system 30. The formation fluid injection system 30 comprises a formation fluid tank 31, wherein a piston is provided within the formation fluid tank 31 to divide a first chamber and a second chamber therein. The first chamber contains formation fluid for the experiment, and the second chamber is filled with a liquid, which may be distilled water or tap water. The first chamber is in communication with the high-temperature and high-pressure reactor 11 by a pipeline (solid line in FIG. 1), and the second chamber is connected to a first high-pressure pump 32, which is able to pump distilled water or tap water into the second chamber, in order to increase the liquid pressure in the second chamber. In this manner, the piston is pushed to move toward the first chamber, in order to inject the formation fluid in the first chamber into the high-temperature and high-pressure reactor 11.

In this embodiment, a shut-off valve 311 is provided at an outlet end of the formation fluid tank 31, and a shut-off valve 15 is provided at an inlet end of the high-temperature and high-pressure reactor 11. The experiment is controlled by turning on or off the shut-off valve 311 and the shut-off valve 15. The maximum working pressure of the first high-pressure pump 32 is no less than 100 MPa. The shut-off valve 311, the shut-off valve 15 and the connecting pipeline can withstand a pressure of no less than 100 MPa.

According to the present invention, the experimental device for dynamics of hydrocarbon generation and expulsion 100 further comprises hydrocarbon expulsion systems 40. As shown in FIG. 1, the hydrocarbon expulsion system 40 is connected an outlet end of the corresponding reaction system 10 via the pipeline. The hydrocarbon expulsion system 40 includes a hydrocarbon excluder 41 and an electrically-operated high-pressure valve 42. The electrically-operated high-pressure valve 42 is connected to the pipeline between the reaction system 10 and the hydrocarbon excluder 41 via the shut-off valve 411. The electrically-operated high-pressure valve 42 can withstand pressure of no less than 100 MPa, with a fine corrosion-resistant property.

In this embodiment, the hydrocarbon excluder 41 comprises a piston chamber including an upper chamber for collecting the products discharged from the high-temperature and high-pressure reaction system 10, and a lower chamber filled with liquid, which may be distilled water or tap water. The upper chamber is in communication with the high-temperature and high-pressure reactor 11 via pipeline, and the lower chamber is connected to a second high-pressure pump 43 capable of automatically moving forward and backward, so that the hydrocarbon excluder 41 is able to collect the products and discharge the products collected in the upper chamber into a gas-liquid separation tank (see below). The second high-pressure pump 43 has a maximum operating pressure of no less than 100 MPa.

According to the present invention, the experimental device for dynamics of hydrocarbon generation and expulsion 100 further comprises a product separation and quantification system for separating, collecting and quantifying source rock products. As shown in FIG. 1, the product separation and quantification system includes a solvent displacer 61 arranged at an inlet end of the reaction system 10. The solvent displacer 61 comprises a piston chamber consisting of a first chamber and a second chamber. The first chamber is filled with organic solvent. Preferably, the organic solvent is a mixture of dichloromethane or n-hexane and propyl alcohol, with a concentration ratio of dichloromethane or n-hexane to propyl alcohol being approximately 85:15. The second chamber is filled with liquid, which may be distilled water or tap water. The first chamber is in communication with the reactor 11 via the pipeline, and the second chamber is connected to a third high-pressure pump 611. Similarly, the third high-pressure pump 611 is able to inject the organic solvent in the first chamber into the high-temperature and high-pressure reactor 11.

In this embodiment, the solvent displacer 61 and the formation fluid injection system 30 are connected in parallel to the inlet end of the reaction system 10. A shut-off valve 612 is provided at an outlet end of the solvent displacer 61. Whether the solvent displacer 61 injects organic solvent for displacement into the reaction system 10 is controlled by turning on or off the shut-off valve 612.

According to the present invention, the product separation and quantification system further comprises a gas-liquid separation tank 62, and a gas metering collector 63 and a liquid light hydrocarbon collection tank 64, both of which are in communication with the gas-liquid separation tank 62. The gas-liquid separation tank 62 is connected to an outlet end of the hydrocarbon expulsion system 40. The gas metering collector 63 and the liquid light hydrocarbon collection tank 64 are connected to an outlet end of the gas-liquid separation tank 62 via the pipeline, respectively. A shut-off valve 631 is provided on the pipeline through which the gas metering collector 63 is in communication with the gas-liquid separation tank 62, and a shut-off valve 641 is provided on the pipeline through which the liquid light hydrocarbon collection tank 64 is in communication with the gas-liquid separation tank 62. In one embodiment, the volume of the gas-liquid separation tank 62 is approximately 250 ml, and the volume of the liquid light hydrocarbon collection tank 64 is approximately 50 ml.

As shown in FIG. 1, a light hydrocarbon purifier 65 is provided between the liquid light hydrocarbon collection tank 64 and the gas-liquid separation tank 62. The gas-liquid separation tank 62 is provided in an electronic cold/hot trap 67, and the light hydrocarbon collection tank 64 is provided in a cold trap 66. The gas-liquid separation tank 62 is provided with an observation window through which the color of the fluid in the gas-liquid separation tank 62 can be observed.

During the actual simulation experiment, when the product separation and quantification system is activated to collect the products from the reaction system 10, the refrigeration mode of the electronic cold/hot trap 67 is activated until the temperature of the gas-liquid separation tank 62 is reduced to less than approximately 0° C., preferably less than approximately −5° C. In this manner, liquid hydrocarbon (including liquid light hydrocarbon and heavy hydrocarbon) and formation fluid discharged from the reaction system 10 are frozen in the gas-liquid separation tank 62, and the gas discharged therefrom enters the gas metering collector 63 for collection and quantification. Then the temperature in the cold/hot trap is raised to about 40° C., so that the liquid light hydrocarbon can be vaporized and separated, and moisture can be removed by drying agent in the light hydrocarbon purifier 65. The purified liquid light hydrocarbon that is temporarily in a gaseous state enters the liquid light hydrocarbon collection tank 64, and its temperature can be lowered by the cold trap 66 for liquefaction. Therefore, the liquid light hydrocarbon can be effectively collected into the liquid light hydrocarbon collection tank 64. Here, "liquid light hydrocarbon" refers to light hydrocarbon in a liquid state at room temperature, which is mainly hydrocarbon component of $C_6$ to $C_{14}$.

In addition, the solvent displacer 61 is able to displace the residual products in the reactor 11, the hydrocarbon excluder 41 and the pipeline, so that residual products can be effectively discharged from the reactor 11, separated and collected, until the fluid is colorless observed from the observation window of the gas-liquid separation tank 62. At this time, the residual products in the reactor 11, the hydrocarbon excluder 41 and the pipeline can be sufficiently collected into the gas-liquid separation tank 62. Then, the heating mode of the electronic cold/hot trap 67 is activated until the temperature of the gas-liquid separation tank 62 reaches 40° C., and the liquid light hydrocarbon continues to enter the liquid light hydrocarbon collection tank 64. Finally, the gas-liquid separation tank 62 and the light hydrocarbon collection tank 64 are unloaded sequentially, thereby completing the collection and quantification of the products. The above arrangements facilitate the subsequent accurate measurement of the amount of discharged oil and gas, in particular, the amount of various components, light hydrocarbons and heavy hydrocarbons in the gas.

According to the present invention, the experimental device for dynamics of hydrocarbon generation and expulsion 100 further comprises a vacuuming system. As shown in FIG. 1, the vacuuming system provided between the hydrocarbon expulsion system 40 and the gas-liquid separation tank 62 is used for vacuuming the reaction system 10 and the hydrocarbon expulsion system 40 before the experiment, and the product collection and quantification system after the experiment. The vacuuming system includes a vacuum pump 50 provided on the pipeline connecting the hydrocarbon expulsion system 40 and the gas-liquid separation tank 62. A shut-off valve 51 is connected to the pipeline at an inlet end of the vacuum pump 50 via a sub-pipeline, and a shut-off valve 52 is provided at an outlet end of the vacuum pump 50. The maximum negative pressure of the vacuum pump 50 is no less than −0.1 MPa. The shut-off valve 51, the shut-off valve 52 and the connecting pipeline are all resistant to a pressure of no less than 100 MPa. The vacuuming system can effectively improve the purity of the products collected by the experimental device for dynamics of hydrocarbon generation and expulsion 100, which is conducive to enhancing the precision of experiment on the hydrocarbon generation and expulsion dynamics.

According to the present invention, a plurality of reaction systems 10 is connected in parallel between the formation fluid system 30 and the vacuuming system 50, and the hydrocarbon expulsion system 40 is correspondingly provided at the outlet end of each reaction system 10. In the embodiment shown in FIG. 1, the experimental device for dynamics of hydrocarbon generation and expulsion 100 comprises 3 high-temperature and high-pressure reaction systems 10 provided in parallel and 3 hydrocarbon expulsion systems 40, thereby forming 3 groups of the high-temperature and high-pressure reaction system 10 and the hydrocarbon expulsion system 40 connected in parallel. The outlet ends of the hydrocarbon expulsion systems 40 are in communication with each other through pipelines, and then with the vacuuming system 50. Among them, the high-temperature and high-pressure reaction system 10 and the hydrocarbon expulsion system 40 are the same in each group, the details of which will not be repeated herein. It should be understood that more or fewer groups of reaction system 10 and hydrocarbon expulsion system 40 may also be provided as needed.

FIG. 3 schematically shows another embodiment of the high-temperature and high-pressure reaction system 10. As shown in FIG. 3, the reaction system 10 includes a reactor 105 and a fixing frame 108. The cylindrical reactor 105 is provided generally in the middle of the fixing frame 108. A pressurizer 22 arranged below the reactor 105 includes a piston cylinder 101 (e.g., a hydraulic cylinder), an inner piston rod 103 and an outer piston rod 102. The piston cylinder 101 is arranged below the fixing frame 108. Both the outer piston rod 102 and the inner piston rod 103 arranged therein have one end extending into the piston cylinder 101 and fitting with the piston cylinder 101 in a sealed and slidable manner, and another end extending upwardly out of the piston cylinder 101 and to the lower end of the reactor 105. Additionally, the reaction system 10 further includes a positioning top column 110 extending downwardly from the upper end of the fixing frame 108, and a stationary fixing clamp 112 may be provided at a lower end of the positioning top column 110. The fixing clamp 112 is able to enclose the upper end of the reactor 105 in a sealing manner. For example, the fixing clamp 112 may be configured as a sealing cap.

When the sample chamber of the reactor 105 is filled with the sample 106, the outer piston rod 102 may move, under the action of the piston cylinder 101, upwardly until being inserted into the reactor 105, in order to seal the lower end of the reactor 105. The inner piston rod 103 may move, under the action of the piston cylinder 101, upwardly until being inserted into the reactor 105, thus clamping the sample 106 with the fixing clamp 112 along the longitudinal direction, and applying an expected pressure to the sample 106.

The above high-temperature and high-pressure reaction system 10 can seal both ends of the reactor 105 and pressurize both ends of the sample 106 through the cooperation between the pressurizer 22 below and the fixing clamp 112 above. Firstly, the height of the high-temperature and high-pressure reaction system 10 can be substantially reduced, which is conducive to the wide application thereof. Secondly, the above arrangement can simplify the operation on the reaction system 10, enabling the user to operate the reaction system 10 through a more simplified procedure. Furthermore, by separately providing the outer piston rod 102 and the inner piston rod 103, not only can the sealing of the reactor 105 be effectively realized, but also the sample 106 can be effectively clamped with an appropriate force. This can avoid the situation when the piston rod is sealed but does not effectively clamp, or clamps with a force too large that may crush the sample, as well as when the sample is effectively clamped but not effectively sealed.

In the embodiment as shown in FIG. 3, the heating furnace 104 arranged outside the reactor 105 may be, for example, a box-type electric furnace, located between the reactor 105 and the fixing frame 108. A temperature controller 107 is configured to detect the temperature within the reactor 105 and control the operating state of the heating furnace 104 based on the detected temperature, so that the temperature within the reactor 105 can be maintained at the temperature required for hydrocarbon generation.

Furthermore, the reaction system 10 further comprises a pressure sensor 109 in communication with the reactor 105. The pressure sensor 109 is able to detect the pressure within the reactor 105. Based on the detected pressure, the user can adjust the pressure in the reactor 105 as required for hydrocarbon generation.

As also shown in FIG. 3, the reaction system 10 comprises a plurality of fluid joints including, for example, an upper joint 111 and a lower joint 113. The upper joint 111 is formed on the fixing clamp 112 and in communication with the sample chamber of the reactor 105. The upper joint 111 is mainly used to discharge fluid from the sample chamber of the reactor 105. The lower joint 113 is formed on a lower portion of the side wall of the reactor 105 and in communication with the sample chamber of the reactor 105. The lower joint 113 can not only inject fluid into the sample chamber of the reactor 105, but also discharge fluid from the sample chamber of the reactor 105.

FIG. 4 is a partial enlargement view of the reaction system 10 as shown in FIG. 3. As shown in FIG. 4, the fixing clamp 112 of the reaction system 10 includes a cylindrical center top column 114 fixedly connected to the positioning top column 110 above. A lower end of the center top column 114 extends downwardly into the sample chamber of the reactor 105. An annular upper pressure sleeve 116 is provided around the center top column 114, an upper end of the upper pressure sleeve 116 abutting against the positioning top column 110. An upper pressure ring 117 arranged around the center top column 114 is provided below the upper pressure sleeve 116. A first sealing assembly 130 is provided at a lower end of the upper pressure ring 117, and between the reactor 105 and a portion of the center top column 114 inserted into the reactor 105. A longitudinally extending communicating channel 115 in communication with the sample chamber of the reactor 105 is formed inside the center top column 114, and in communication with the upper joint 111 inserted into the center top column 114.

The inner piston rod 103 of the reaction system 10 includes an inner main rod 123 cooperating with the piston cylinder 101. An inner top rod 119 is fixedly provided on an upper end of the inner main rod 123, an upper end of the inner top rod 119 extending into the sample chamber of the reactor 105 to clamp and pressurize the sample 106 together with the center top column 114 as mentioned above.

The outer piston rod 102 includes an outer main rod 122 cooperating with the piston cylinder 101. A lower pressure ring 121 arranged around the inner top rod 119 is provided above the outer main rod 122. A second sealing assembly 140 is provided above the lower pressure ring 121, and between the reactor 105 and a portion of the inner top rod 119 inserted into the reactor 105.

Figure 9:
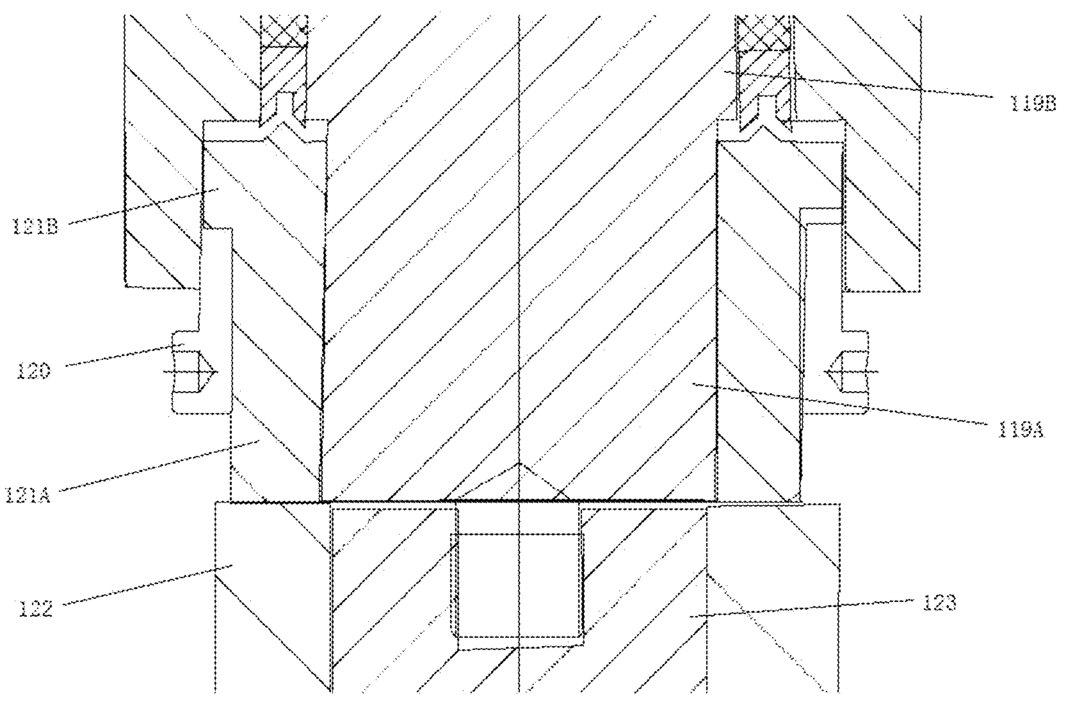
FIG. 9 is a partial enlargement view of another portion of the high-temperature and high-pressure reaction system as shown in FIG. 4.

Additionally, a fixing ring 120 may be provided between the lower pressure ring 121 and the reactor 105. The fixing ring 120 is detachably connected to the reactor, for example, through threaded connection. As shown in FIG. 9, the inner top rod 119 may include a cylindrical inner top rod body 119A, and a flange 119B extending radially outward at an upper end of the inner top rod body 119A. The lower pressure ring 121 includes a cylindrical lower pressure ring body 121A, and a flange 121B extending radially outward at an upper end of the lower pressure ring body 121A. When the lower pressure ring 121 is arranged around the inner top rod body 119A, an upper end surface of the lower pressure ring 121 at least partially overlaps a lower end surface of the flange 119B. When the fixing ring 120 is arranged around the lower pressure ring 121, an upper end surface of the fixing ring 120 at least partially overlaps a lower end surface of the flange 121B. This structure facilitates the sealing of the lower end of the sample chamber of the reactor 105, so as to retain the sample 106 therein. During assembly, the sample 106 may first be inserted into the sample chamber of the reactor 105. Then, the inner top rod 119 and the lower pressure ring 121 are inserted in turn. Finally, the fixing ring 120 is inserted between the reactor 105 and the lower pressure ring 121, and the fixing ring 120 is fixed to the reactor 105.

A sample sleeve enclosing the sample 106 is provided in the sample chamber of the reactor 105. The sample sleeve includes a cylindrical body 150 arranged between the first sealing assembly 130 and the second sealing assembly 140, and between the reactor 105 and the rock sample 106. The sample sleeve may also include a corresponding top cover as described in the embodiment above.

As the outer piston rod 102 moves upwardly, the outer main rod 122 and the lower pressure ring 121 also move upwardly together. In this manner, both the lower compression ring 121 and the upper compression ring 117 clamp the first sealing assembly 130, the cylindrical body 150 and the second sealing assembly 140 arranged therebetween, and apply pressure in the longitudinal direction thereto. In this case, the first sealing assembly 130 expands radially to closely cooperate with the reactor 105 and the center top column 114, and the second sealing assembly 140 expands radially to closely cooperate with the reactor 105 and the inner top column 119. As a result, the reactor 105 can be effectively sealed. That is, the upper and lower ends of the reactor 105 can be sealed by the movement of the outer piston rod 102.

Preferably, the first sealing assembly 130, the cylindrical body 150, and the second sealing assembly 140 have substantially the same inner diameter. At the end of the experiment, the fixing clamp 112 can be detached from the positioning top column 110. In this case, the upper end of the reactor 105 is opened, and the rock sample 106 can be easily pushed out of the reactor 105 by pushing the sample 106 and the center top column 114 with a small force through the inner top rod 119 in the inner piston rod 103, thereby easily obtaining a complete and fixed residual sample.

Figure 5:
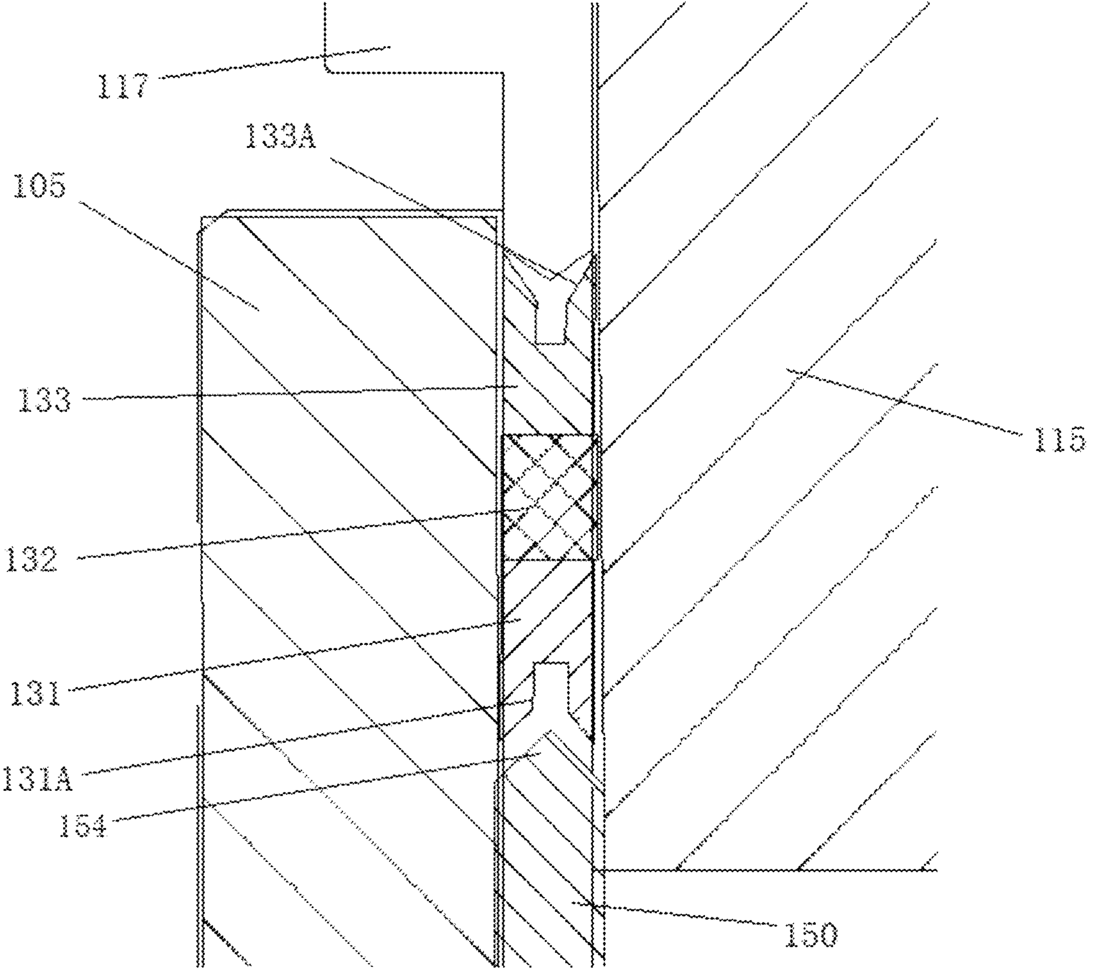
FIG. 5 and FIG. 6 are partial enlargement views each showing a portion of the high-temperature and high-pressure reaction system as shown in FIG. 4.

FIG. 5 shows the structure of the first sealing assembly 130 in more detail. The first sealing assembly 130 includes a third sealing ring 133, a graphite sealing ring 132, and a first sealing ring 131 arranged sequentially from top to bottom. A first slot 131A facing downward is formed at a lower end of the first sealing ring 131. Accordingly, a first wedge portion 154 extending upward is arranged at an upper end of the cylindrical body 150, and has a substantially triangular cross section. When the outer piston rod 102 moves upward, the first wedge portion 154 can be inserted into the first slot 131A and keep the first slot 131A open. In this manner, the first sealing ring 131 can expand radially for sealing. Similarly, a third opening 133A facing upward is formed at the upper end of the third sealing ring 133. Correspondingly, a wedge portion extending downward is provided at the lower end of the upper pressure ring 117.

Figure 6:
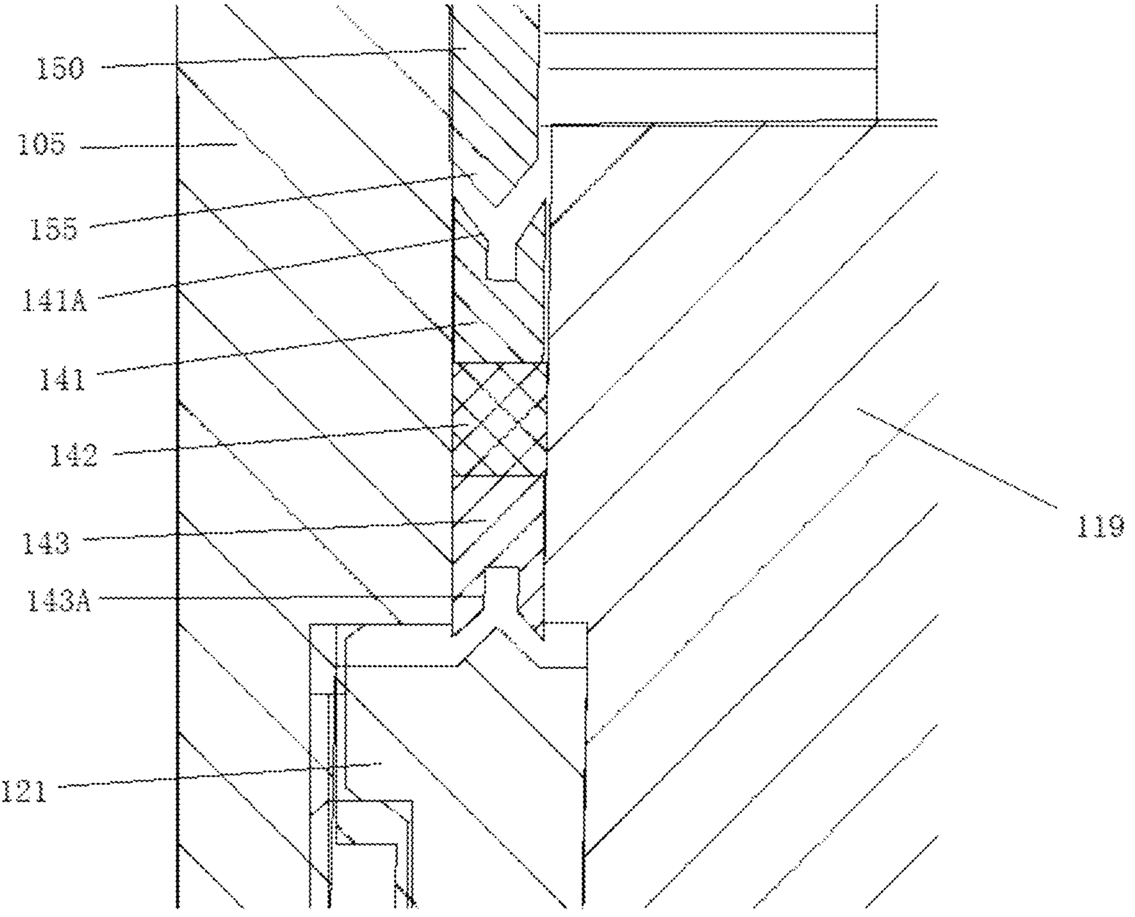

FIG. 6 shows the structure of the second sealing assembly 140 in more detail. The second sealing assembly 140 includes a second sealing ring 141, a graphite sealing ring 142, and a fourth sealing ring 143 arranged sequentially from top to bottom. A second slot 141A facing upward is formed at an upper end of the second sealing ring. Accordingly, a second wedge portion 155 extending downward is arranged at a lower end of the cylindrical body 150. A fourth opening 143A facing downward is formed at a lower end of the fourth sealing ring 143. Accordingly, a wedge portion extending upward is provided at an upper end of the lower pressure ring 121.

In addition, a side wall of the reactor 105 is provided with a temperature measuring joint 118 that extends into the side wall along a radial direction. With the temperature measuring joint 118, the temperature controller 107 can detect the temperature inside the reactor 105.

According to the present invention, an experiment method for dynamics of hydrocarbon generation and expulsion is also proposed, wherein the experimental device for dynamics of hydrocarbon generation and expulsion 100 according to the present invention is adopted. The method will be further illustrated as follows.

Firstly, the experimental device for dynamics of hydrocarbon generation and expulsion 100 according to the present invention is provided.

Then, source rock samples and formation fluid are provided. The formation fluid is obtained by collecting or preparing the formation fluid in the region where the source rock samples are located, and then put into the formation fluid tank 31 of the formation fluid injection system 30. At the same time, according to the formation conditions of the region where the source rock sample is located, the parameters of the experiment on hydrocarbon generation and expulsion dynamics are set, which include heating temperature, lithostatic pressure, formation fluid pressure, hydrostatic pressure, heating rate, time, and differential pressure between the reaction system and the hydrocarbon expulsion system.

Then, the source rock samples are mounted. When mounting the source rock samples, the source rock samples are first cut to form a plurality of cylindrical shaped samples. Preferably, a multi-joint coring machine for brittle shale is used to cut the source rock samples. The cylindrical shaped sample has a diameter less than the inner diameter of the cylindrical body 14A of the sample sleeve 14, and a length less than the length of the cylindrical body 14A. Then, in the embodiment as shown in FIG. 2, each of the cylindrical shaped samples is mounted into a corresponding cylindrical body 14A of the corresponding sample sleeve 14, and sealed by the top cover 14B, so that the samples are sealed and mounted within the sample sleeves 14 and into the reactor 11. After that, each of the high-temperature and high-pressure reactors 11 mounted with the sample is placed into a corresponding heating furnace 21 in sequence. In the meantime, the pressurizer 22 is mounted on the top portion of the corresponding high-temperature and high-pressure reactor 11, respectively. Thus, the mounting of the source rock samples is completed.

In the embodiment as shown in FIG. 3, the sample 106 with the sample sleeve is first placed into the reactor 105. The outer piston rod 102 is moved upward by the piston cylinder 101 until the reactor 105 is sealed. During this procedure, the inner piston rod 103 moves upward with the outer piston rod 102, but does not clamp the sample 106 with the fixing clamp 112.

Then, the air-tightness of the high-temperature and high-pressure reaction system 10 is checked. First, the shut-off valves 311, 612 at the respective outlet ends of the formation fluid tank 31 and the solvent displacer 61, the shut-off valve 51 connected to the inlet end of the vacuum pump 50, and the shut-off valve 52 at the outlet end of the vacuum pump 50 are turned off, while all the other shut-off valves are turned on. Also, the second high-pressure pump 43 in each hydrocarbon expulsion system 40 is turned on to lift the piston in each hydrocarbon discharger 41 to the top portion of the corresponding upper chamber. Then, the controller 23 is activated to control each pressurizer 22 for applying a sealing pressure of 100 MPa to the corresponding high-temperature and high-pressure reactor 11. Then, the vacuum pump 50 is activated for vacuuming the high-temperature and high-pressure reaction system 10 and the hydrocarbon expulsion system 40. The vacuuming lasts for 3 to 5 min until the vacuum degree displayed by the vacuum pump 50 is less than −0.1 MPa. Then, the vacuum pump 50 is turned off, the shut-off valve 311 at the outlet end of the formation fluid tank 31 is turned on, and the first high-pressure pump 32 is activated, so that the formation fluid in the first chamber of the formation fluid tank 31 is injected into each high-temperature and high-pressure reactor 10, and the pressure of the formation fluid in each high-temperature and high-pressure reactor 10 is no less than 50 MPa for 10 min. The pressure of the formation fluid in each high-temperature and high-pressure reactor 10 is then observed. If it decreases, the above checking steps are repeated, and if not, the shut-off valve 311 at the outlet end of the formation fluid tank 31 is turned off, and the shut-off valve 51 connected to the inlet end of the vacuum pump 50 is turned on, in order to decrease the pressure of the formation fluid in each high-temperature and high-pressure reactor 10 to 2 MPa. In this manner, the air-tightness checking of the high-temperature and high-pressure reaction system 10 is completed. The pressure change of the formation fluid in the high-temperature and high-pressure reaction system 10 can be observed through a pressure gauge (not shown), which can be provided, for example, on a pipeline between the high-temperature and high-pressure reactor 11 and the electrically-operated high-pressure valve 42.

Then, the pressurizer 22 is controlled by the controller 23 to heat and pressurize the high-temperature and high-pressure reactor 11, so as to carry out the experiment on dynamics of hydrocarbon generation and expulsion. First, the shut-off valve 15 corresponding to the inlet end of each high-temperature and high-pressure reaction system 10, and the shut-off valve 412 corresponding to the outlet end of each hydrocarbon discharger 41 are turned off. The pressurizer 22 is controlled by the controller 23 to apply the set lithostatic pressure to the sample in the high-temperature and high-pressure reactor 11. Then, a program configured to set the heating rate, heating temperature, and time is controlled by the controller 23, so as to carry out the experiment on dynamics of hydrocarbon generation and expulsion. During the experiment, when the differential pressure between the high-temperature and high-pressure reaction system 10 and the hydrocarbon expulsion system 40 reaches the set value, the electrically-operated high-pressure valve 42 in the hydrocarbon expulsion system 40 is automatically turned on, so that the pressure of the high-temperature and high-pressure reaction system 10 decreases to the hydrostatic pressure value, and the electrically-operated high-pressure valve 42 is turned off. Then the above step is repeated to conduct the experiment according to the set heating rate. The experiment is completed until the set temperature is reached.

At the end of the experiment, the products generated by each high-temperature and high-pressure reaction system 10 are collected and quantified. Specifically, the products generated in the high-temperature and high-pressure reactor 11 are collected and quantified through the product separation and quantification system, so as to obtain the experimental data which will be further processed through the dynamics equations and parameters of source rock hydrocarbon generation and expulsion. During the collection and quantification, first, the shut-off valve 52 at the outlet end of the vacuum pump 50 (i.e., the inlet end of the gas-liquid separation tank 62), the shut-off valves 631, 641 at the respective inlet ends of the gas metering collector 63 and the liquid light hydrocarbon collection tank 64 are turned on, and the vacuum pump 50 is activated for vacuuming the product collection system. The vacuuming lasts for 3 to 5 min, then vacuum pump 50 is turned off until the vacuum degree shown by the vacuum pump 50 is less than −0.1 MPa. Then, the shut-off valve 411 at the inlet end of each hydrocarbon discharger 41 and the corresponding electrically-operated high-pressure valve 42 are opened for discharging the products in each high-temperature and high-pressure reaction system 10. At the same time, the refrigeration mode of the electronic cold/hot trap 67 is activated so that the temperature of the gas-liquid separation tank 62 is below 0° C. (preferably below −5° C.). In this case, the liquid hydrocarbon and formation fluid discharged from the reaction system 10 are frozen in the gas-liquid separation tank 62, and the discharged gas enters the gas metering collector 62 for collection and quantification. The temperature of the cold/hot trap 67 is then raised to about 40° C., so that the liquid light hydrocarbon in the gas-liquid separation tank 62 can be vaporized and separated, and water can be removed by the desiccant (e.g., polymer water-absorbent resin) in the light hydrocarbon purifier 65. The purified liquid light hydrocarbon temporarily in a gaseous state enters the liquid light hydrocarbon collection tank 64. The temperature of the liquid light hydrocarbon temporarily in a gaseous state in the liquid light hydrocarbon collection tank 64 can be decreased by the cold trap 66 for the liquefaction thereof. As a result, the liquid light hydrocarbon can be effectively collected into the liquid light hydrocarbon collection tank 64. Then, the shut-off valve 631 at the inlet end of the gas metering collector 63 is turned off, and the shut-off valve 15 at the inlet end of each high-temperature and high-pressure reaction system 10 and the shut-off valve 612 at the outlet end of the solvent displacer 61 are turned on. The third high-pressure pump 611 is activated to inject the organic solvent in the first chamber of the solvent displacer 61 into the high-temperature and high-pressure reaction system 10, so as to displace the residual hydrocarbon in the high-temperature and high-pressure reactor 10, the hydrocarbon discharger 41 and the pipeline, until the colorless fluid is observed from the observation window of the gas-liquid separation tank 62. Afterwards, the shut-off valve 412 at the outlet end of each hydrocarbon discharger 41 and the shut-off valve 52 at the inlet end of the gas-liquid separation tank 62 are turned off, and the heating mode of the electronic cold/hot trap 67 is activated, so that the temperature of the gas-liquid separation tank 62 reaches 40° C. The liquid light hydrocarbon in the gas-liquid separation tank 62 continues to be purified by the light hydrocarbon purifier 65 and then enters into the liquid light hydrocarbon collection tank 64. Finally, the gas-liquid separation tank 62 and the light hydrocarbon collection tank 64 are unloaded in turn, thereby completing the collection and quantification of the products. In this case, the experiment on hydrocarbon generation and expulsion dynamics under the geological conditions is completed.

According to the present invention, the collected light hydrocarbon is identified in accordance with CN SY/T0542-2008 Gas-phase Chromatography for Analysis of Stable Light Hydrocarbon Components, the collected gas is identified in accordance with CN GB/T13610-2014 Gas-phase Chromatography for Analysis of Natural Gas Components, the liquid hydrocarbon in the gas-liquid separation tank is quantified in accordance with the natural constant weight method, and the source rock sample from the high-temperature and high-pressure reactor 11 is identified in accordance with CN SY/T5118-2005 Determination of Chloroform Bitumen in Rocks. As a result, the experimental data are obtained, which are further processed through dynamics equations and parameters of hydrocarbon generation and expulsion of source rock.

According to the present invention, the experimental device for dynamics of hydrocarbon generation and expulsion 100 is able to simultaneously conduct an experiment on multiple groups of organics in the limited pore space of source rock under combined action of lithostatic pressure of overlying strata, formation fluid pressure and formation fluid, as well as co-control in hydrocarbon generation and expulsion, significantly improving the experimental efficiency under the formation condition. The experimental device for dynamics of hydrocarbon generation and expulsion 100 is able to collect and quantify all the components in the products through the product separation and quantification system, which effectively enhances experimental precision and analytical efficiency, obtains more reasonable parameters of hydrocarbon generation and expulsion dynamics, and greatly facilitates the research on hydrocarbon generation mechanism, oil-gas migration, oil-gas production in the basin, and the prediction of oil-gas resources. During the collection and quantification of the products, the product separation and quantification system is able to displace residual hydrocarbons in the porous medium element 14, the hydrocarbon discharger 41 and the pipeline in the high-temperature and high-pressure reactor 10 through the solvent displacer 61, thereby effectively avoiding the loss of light hydrocarbons. The experimental device for dynamics of hydrocarbon generation and expulsion 100 realizes the collection and quantification of light hydrocarbon in the products, obtaining more reasonable experimental data. According to the present invention, the method for experiment on hydrocarbon generation and expulsion dynamics using the experimental device 100 is characterized by high control precision and controllability, thereby greatly improving the experimental efficiency, effectively ensuring the precision of the experimental data, and significantly enhancing the reliability of the experimental results.

Finally, it should be noted that the foregoing description is merely illustrative of preferred embodiments of the present invention, and is not intended to restrict the present invention. Although the present invention is described in detail with reference to the above embodiments, it is still possible for one skilled in the art to modify the technical solutions defined in the above embodiments or to replace some of the technical features with equivalent ones. Any modifications, equivalent substitutions, improvements, and the like falling within the spirit and principles of the present invention are intended to be included within the scope of protection of the present invention.

The invention claimed is:

1. An experimental device for dynamics of hydrocarbon generation and expulsion, comprising a reactor having a sample chamber formed therein for placing a sample, a sample sleeve being arranged within the sample chamber for receiving the sample, wherein the sample sleeve comprises a cylindrical body enclosing the sample in a circumferential direction, an outer side wall of the cylindrical body being in engagement with an inner side wall of the reactor, wherein the cylindrical body comprises:

a plurality of neck portions each having a relatively small outer diameter, at least one flow hole being formed on each of the neck portions to pass through the neck portion along a radial direction, wherein the neck portion is spaced apart from the inner side wall of the reactor to form a gap in communication with the flow hole when the sample sleeve is arranged within the reactor, and the flow hole overlaps the outer side wall of the sample when the sample is arranged within the sample sleeve; and a plurality of closed portions each having a relatively large outer diameter, the plurality of closed portions and the plurality of neck portions being alternately arranged along a longitudinal direction, and the closed portions abutting against the inner side wall of the reactor when the cylindrical body is arranged within the reactor, wherein at least one flow groove passing through the cylindrical body along the longitudinal direction are formed on the cylindrical body and in communication with the gap between each neck portion and the inner side wall of the reactor, so that the channel for product circulation is formed between the outer side wall of the sample and the inner side wall of the reactor through the flow hole, the gap and the flow groove.

2. The experimental device for dynamics of hydrocarbon generation and expulsion according to claim 1, wherein the sample sleeve further comprises a top cover connected to the cylindrical body in a sealing manner, wherein the top cover is configured to be porous and enclose the sample together with the cylindrical body, so that the sample is in communication with the sample chamber through the top cover.

3. The experimental device for dynamics of hydrocarbon generation and expulsion according to claim 2, herein the top cover is provided with a communication hole passing through the top cover along an axial direction.

4. The experimental device for dynamics of hydrocarbon generation and expulsion according to claim 2, wherein the top cover is formed by a porous medium element.

5. The experimental device for dynamics of hydrocarbon generation and expulsion according to claim 1, wherein the reactor is configured to be cylindrical, and has an opening in communication with the sample chamber at each of two opposite ends of the reactor, and the experimental device for dynamics of hydrocarbon generation and expulsion further comprises:

a fixing clamp configured to be inserted into the sample chamber from one end of the reactor; and a pressurizer, which comprises:

a piston cylinder at the other end of the reactor, an inner piston rod, one end of the inner piston rod being inserted into the piston cylinder and in cooperation with the piston cylinder in a sealed and slidable manner, the other end thereof extending out of the piston cylinder and being inserted into the sample chamber of the reactor, so as to clamp the sample in the sample chamber together with the fixing clamp, and an annular outer piston rod arranged around the inner piston rod, one end of the outer piston rod being inserted into the piston cylinder and slidable relative to the piston cylinder in a sealed manner, the other end of the outer piston rod extending out of the piston cylinder and being inserted into the sample chamber of the reactor; and wherein the fixing clamp and the pressurizer clamp two ends of the sample sleeve respectively, thereby realizing sealing of the reactor together with the sample sleeve.

6. The experimental device for dynamics of hydrocarbon generation and expulsion according to claim 5, wherein a first sealing assembly is provided between a portion of the fixing clamp inserted into the sample chamber and the sample sleeve, a second sealing assembly is provided between the other end of the outer piston rod and the sample sleeve, and when the outer piston rod moves toward the reactor, the first sealing assembly is pressed to expand radially to form a seal between the fixing clamp and the inner side wall of the reactor, and the second sealing assembly is pressed to expand radially to form a seal between the inner piston rod and the inner side wall of the reactor.

7. The experimental device for dynamics of hydrocarbon generation and expulsion according to claim 6, wherein a first wedge portion extending along the longitudinal direction is formed at one end of the cylindrical body, and the first sealing assembly comprises a first sealing ring in engagement with the first wedge portion and formed with a first slot facing toward the first wedge portion, the first sealing ring expanding radially to form a seal when the first wedge portion is inserted into the first slot; and a second wedge portion extending along the longitudinal direction is formed at the other end of the cylindrical body, and the second sealing assembly comprises a second sealing ring in engagement with the second wedge portion and formed with a second slot facing toward the second wedge portion, the second sealing ring expanding radially to form a seal when the second wedge portion is inserted into the second slot.

8. The experimental device for dynamics of hydrocarbon generation and expulsion according to claim 5, wherein the inner piston rod comprises an inner top rod inserted into the sample chamber of the reactor, the inner top rod comprising a cylindrical inner top rod body and an inner top rod flange extending radially outward from an end portion of the inner top rod body, and the outer piston rod comprises a lower pressure ring inserted into the sample chamber of the reactor and arranged between the reactor and the inner top rod, an upper end surface of the lower pressure ring at least partially overlapping a lower end surface of the inner top rod flange, and the lower pressure ring comprising a cylindrical lower pressure ring body and a lower pressure ring flange extending radially outward from an end portion of the lower pressure ring body.

9. The experimental device for dynamics of hydrocarbon generation and expulsion according to claim 8, wherein the device further comprises a fixing ring arranged between the reactor and the lower pressure ring, and detachably connected to the reactor, an upper end surface of the fixing ring at least partially overlapping a lower end surface of the lower pressure ring flange.

10. The experimental device for dynamics of hydrocarbon generation and expulsion according to claim 5, comprising:

a plurality of reaction systems connected in parallel;

a control system for controlling parameters of temperature, pressure and time of each reaction system;

a formation fluid injection system for injecting formation fluid into each reaction system;

a hydrocarbon expulsion system connected to an outlet end of each reaction system, for discharging products a product from the reaction system during an experiment on dynamics of hydrocarbon generation and expulsion;

a product separation and quantification system for separating, collecting and quantifying the product, comprising a solvent displacer connected to an inlet end of each reaction system, and a gas-liquid separation tank connected to an outlet end of the hydrocarbon expulsion system; and a vacuuming system provided between the hydrocarbon expulsion system and the gas-liquid separation tank, for vacuuming the reaction system, the hydrocarbon expulsion system and the product separation and quantification system.

11. The experimental device for dynamics of hydrocarbon generation and expulsion according to claim 10, wherein the product separation and quantification system further comprises a gas metering collector and a liquid light hydrocarbon collection tank, which are in communication with the gas-liquid separation tank, for collecting gas and liquid light hydrocarbon separated from the gas-liquid separation tank, respectively.

12. The experimental device for dynamics of hydrocarbon generation and expulsion according to claim 11, wherein a light hydrocarbon purifier for removing moisture is provided between the liquid light hydrocarbon collection tank arranged in a cold trap and the gas-liquid separation tank arranged in an electronic cold/hot trap.

13. An experimental method for dynamics of hydrocarbon generation and expulsion using the experimental device for dynamics of hydrocarbon generation and expulsion according to claim 1, comprising steps of:

mounting the sample within the sample sleeve, and placing the sample sleeve in the reactor; and conducting an experiment on dynamics of hydrocarbon generation and expulsion.

14. The experimental method for dynamics of hydrocarbon generation and expulsion according to claim 13, wherein the outer piston rod moves upward when the sample is placed in the reactor, so that the outer piston rod and the fixing clamp support two ends of the sample sleeve respectively, forming a seal within the reactor; and the inner piston rod moves upward so as to clamp the sample together with the fixing clamp.

15. The method for experiment on dynamics of hydrocarbon generation and expulsion according to claim 13, wherein, after the experiment, the fixing clamp is removed to form an opening at one end of the reactor and in communication with the sample chamber, so that the sample in the sample chamber is pushed by the inner piston rod at the other end of the reactor until the sample leaves the reactor via the opening.

16. The method for experiment on dynamics of hydrocarbon generation and expulsion according to claim 13, wherein after the experiment the product in the reactor are collected, wherein the liquid light hydrocarbon and the gas are collected separately.

* * * * *